United States Patent
Xu et al.

(10) Patent No.: US 11,356,043 B2
(45) Date of Patent: Jun. 7, 2022

(54) LINEAR OSCILLATORY MACHINE CONTROL METHOD BASED ON ADAPTIVE FULL-ORDER DISPLACEMENT OBSERVER

(71) Applicant: HUAZHONG UNIVERSITY OF SCIENCE AND TECHNOLOGY, Hubei (CN)

(72) Inventors: Wei Xu, Hubei (CN); Qizhe Wang, Hubei (CN); Xiang Li, Hubei (CN); Kaiju Liao, Hubei (CN); Yirong Tang, Hubei (CN); Yi Liu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/298,600

(22) PCT Filed: Aug. 27, 2020

(86) PCT No.: PCT/CN2020/111562
§ 371 (c)(1),
(2) Date: May 31, 2021

(87) PCT Pub. No.: WO2021/237964
PCT Pub. Date: Dec. 2, 2021

(65) Prior Publication Data
US 2022/0123674 A1    Apr. 21, 2022

(30) Foreign Application Priority Data
May 25, 2020 (CN) .......................... 202010450210.6

(51) Int. Cl.
*H02P 21/00* (2016.01)
*H02P 25/06* (2016.01)
*H02P 21/13* (2006.01)

(52) U.S. Cl.
CPC .......... *H02P 21/0017* (2013.01); *H02P 21/13* (2013.01); *H02P 25/06* (2013.01)

(58) Field of Classification Search
CPC ....... H02P 21/0017; H02P 21/13; H02P 25/06
(Continued)

(56) References Cited

U.S. PATENT DOCUMENTS 7,633,246 B2 * 12/2009 Bernier ................... B25B 27/10
                                                                318/632

FOREIGN PATENT DOCUMENTS

CN            110912483           3/2020

OTHER PUBLICATIONS

"International Search Report (Form PCT/ISA/210) of PCT/CN2020/111562," dated Feb. 24, 2021, pp. 1-5.

* cited by examiner

*Primary Examiner* — David Luo
(74) *Attorney, Agent, or Firm* — JCIP Global Inc.

(57) ABSTRACT

The disclosure discloses a linear oscillatory machine control method based on an adaptive full-order displacement observer. The method includes the following steps: a full-order displacement observer is constructed; the system equivalent spring elasticity coefficient and equivalent damping coefficient are used as parameters to be identified, the full-order displacement observer serves as an adjustable model, and the machine itself serves as a reference model; an error state equation is constructed based on the error of the adjustable model and the reference model; Popov's hyperstability theory is adopted to obtain the operation upper critical frequency and the adaptive formula of adjustable parameters that make the error state equation converge; the machine is operated at a frequency lower than the upper critical frequency, the machine current and voltage signals (Continued)

measured during the operation process are input into the full-order displacement observer, thereby realizing frequency tracking and displacement control.

20 Claims, 2 Drawing Sheets

(58) Field of Classification Search
USPC .................. 318/400.4, 400.37, 400.01, 700
See application file for complete search history.

LINEAR OSCILLATORY MACHINE CONTROL METHOD BASED ON ADAPTIVE FULL-ORDER DISPLACEMENT OBSERVER

CROSS-REFERENCE TO RELATED APPLICATION

This application is a 371 of international application of PCT application serial no. PCT/CN2020/111562, filed on Aug. 27, 2020, which claims the priority benefits of China application no. 202010450210.6, filed on May 25, 2020. The entirety of each of the above-mentioned patent applications is hereby incorporated by reference herein and made a part of this specification.

BACKGROUND

Technical Field

The disclosure relates to linear oscillatory machine frequency control and sensorless control technology, and more specifically, relates to a linear oscillatory machine control method based on an adaptive full-order displacement observer.

Description of Related Art

Conventional reciprocating compressor is driven by a rotating machine through a crank shaft mechanism. In comparison, novel linear compressor is directly driven by a linear oscillatory machine, eliminating the crank shaft mechanism, and therefore having many advantages such as small size, low noise, and high efficiency. To give full play to these advantages, special control strategies and control techniques must be adopted to adapt to the operating characteristics of linear oscillatory machines, and the most important of which are resonant frequency tracking control strategies and sensorless control techniques.

In terms of resonant frequency control, the mechanical part of the linear oscillatory machine is a second-order damping oscillatory system composed of a piston and a mechanical resonant spring, and exists a system resonant frequency related to the whole system equivalent spring elasticity coefficient. Theoretical analysis shows that when the machine operating frequency is equal to the system resonant frequency, the whole system can achieve the optimal efficiency and the energy saving effect is the best. In addition, the load carried by the linear compressor is a non-linear gas force. Theoretical analysis and experiments show that the gas force load can be described by gas equivalent spring elasticity coefficient and gas equivalent damping coefficient. When the load changes, the spring elasticity coefficient of the whole system will change, which in turn will cause the system resonant frequency to change. Therefore, resonant frequency tracking control must be adopted to make the operating frequency be always equal to the current resonant frequency of the system.

In terms of stroke control, the piston stroke of the conventional reciprocating compressor is limited by the crank shaft mechanism, while the linear compressor eliminates the crank shaft mechanism, and the piston can operate freely, so the piston displacement signal must be obtained and controlled in real time to control the volume of compressor exhaust and prevent the piston from cylinder collision. However, if a displacement sensor is used to obtain piston displacement signal, it will not only increase the system volume and reduce the system reliability, but also cause problems such as difficulty in installing the sensor. Therefore, accurate sensorless control technology must be adopted to calculate the displacement of the piston in real time based on voltage and current signals.

For the resonant frequency tracking control of linear oscillatory machines, the current algorithm is mainly based on the phase angle of displacement and current, through which the system frequency is controlled indirectly based on the characteristic that the phase angle of current and displacement is 90° in the resonant state. The major problem of this approach is that the convergence speed is slow, and the control accuracy is influenced by many factors. Meanwhile, this type of algorithm is based on the steady state characteristics of the system, so the resonant frequency tracking control can only start after the stroke control system reaches the steady state, thus significantly reducing the response speed of the entire system. As for the sensorless control of linear oscillatory machines, the current algorithms mainly include back electromotive force (back-EMF) integration: Since the back-EMF of the machine is proportional to the speed, the back-EMF is calculated through the voltage and current signals, and then integral operation is adopted to obtain the displacement signal. However, because there is pure integration, this algorithm will cause problems such as integration drift and integration initial value, which will eventually lead to the saturation of the integrator.

In addition, the current machine control method simply combines the above two algorithms, that is, the back-EMF integration algorithm provides the displacement signal required by the resonant frequency tracking control algorithm. When the displacement signal is inaccurate, deviation will occur to frequency control, which will make the reliability of the entire control system worse.

SUMMARY

In view of the above defects or needs of improvement in the related art, the present disclosure provides a linear oscillatory machine control method based on an adaptive full-order displacement observer, which aims to solve the problem in current sensorless algorithm, that is, integration drift and inaccurate estimation, as well as the problem in resonance frequency tracking control algorithm, that is, slow convergence speed, poor accuracy, and slow system response.

In order to achieve the above purpose, the present disclosure provides a linear oscillatory machine control method based on an adaptive full-order displacement observer, including:

S1. A full-order displacement observer is constructed; the full-order displacement observer is utilized to observe the displacement of the linear oscillatory machine mover.

S2. The system equivalent spring elasticity coefficient and equivalent damping coefficient are used as adjustable parameters, substitute them into the full-order displacement observer to construct an adjustable model, and the machine itself serves as a reference model.

S3. An error state equation is constructed based on the error of the adjustable model and the reference model.

S4. Popov's superstability theory is adopted to obtain the upper critical frequency for stable operation of the system and the adaptive formula of adjustable parameters that make the error state equation converge. The adaptive formula of adjustable parameters is expressed by current error.

S5. The machine is operated at a frequency lower than the upper critical frequency.

The machine current and voltage signals measured during the operation process are input into the full-order displacement observer, the observed displacement output by the full-order observer is adopted to perform closed-loop control on the machine displacement, and the observed resonant frequency output by the observer is adopted as operating frequency of the system.

Further, the adjustable model equation is:

$$p\begin{bmatrix}\hat{x}\\\hat{v}\\\hat{i}\end{bmatrix}=\begin{bmatrix}0 & 1 & 0\\-\hat{K} & -\hat{C} & \frac{k_i}{m}\\0 & -\frac{k_i}{L} & -\frac{R}{L}\end{bmatrix}\begin{bmatrix}\hat{x}\\\hat{v}\\\hat{i}\end{bmatrix}+\begin{bmatrix}0\\0\\\frac{1}{L}\end{bmatrix}u+\begin{bmatrix}g_1\\g_2\\g_3\end{bmatrix}(i-\hat{i})$$

In the equation, p represents the differential operation element, $\hat{x}$ represents the displacement observation value, $\hat{v}$ represents the speed observation value, $\hat{i}$ represents the current observation value, $\hat{K}=\hat{k}/m$, $\hat{k}$ represents the estimated value of the system equivalent spring elasticity coefficient calculated through the adaptive formula of parameter, $\hat{c}$ represents an estimated value of the system equivalent damping coefficient obtained through the adaptive rate of parameter, m represents the quality of the mover piston, L represents the machine stator inductance, R represents the machine stator resistance, $k_i$ represents the machine thrust coefficient, u represents the input voltage, i represents the stator current, $g_1$, $g_2$, and $g_3$ represent the observer feedback matrix coefficients.

Further, in step S3, the step of constructing an error state equation based on the errors of the adjustable model and the reference model is specifically as follows: subtracting the adjustable model equation from the linear oscillating machine state equation to obtain the error state equation.

Further, the adaptive rate of the adjustable parameter expressed by the current error is as follows:

$$\hat{K}=k_I\int \hat{x}e_i dt+k_P \hat{x}e_i+K(0)$$

$$\hat{C}=k_I\int \hat{v}e_i dt+k_P \hat{v}e_i+C(0)$$

In the equation, $k_I$ represents the integral coefficient, $k_P$ represents the proportional coefficient, $e_i$ represents the current error, and K(0) and C(0) represent the initial values of the parameters to be identified.

Further, the full-order displacement observer has an open-loop structure, if its feedback matrix coefficients $g_1$, $g_2$, and $g_3$ are all zero.

Further, the upper critical frequency for stable operation of the system is as follows:

$$w_0=\sqrt{\frac{k}{m}+\frac{Rc+k_i^2}{mL}}$$

Furthermore, the full-order displacement observer has a closed-loop structure, if its feedback matrix coefficients are:

$$g_3=(n-1)\left(\frac{c}{m}+\frac{R}{L}\right)$$

$$g_2=\frac{(n^2-1)(Rc+kL+k_i^2)-Lcg_3}{-mk_i}$$

$$g_1=\frac{R(n^3-1)-Lg_3}{k_i}$$

In the equation, n is a scale coefficient greater than 1.

Further, by using the above feedback matrix coefficients, the poles of the full-order displacement observer are configured to be n times the poles of the machine itself, so that the upper critical frequency for the stable operation of the system is as follows:

$$w_0=n\sqrt{\frac{k}{m}+\frac{Rc+k_i^2}{mL}}$$

In general, compared with the related art, the above technical solutions conceived by the present disclosure can achieve the following advantageous effects.

(1) Directing at the resonant frequency tracking control, the present disclosure constructs an adaptive formula of adjustable parameter. The disclosure only needs to use the current error and estimated displacement to quickly and accurately identify the equivalent spring elasticity coefficient of the current system, and obtain the resonant frequency after simple calculation. Without relying on the steady-state relationship between displacement and current, the resonant frequency identification calculation can be completed before the amplitude control system reaches the steady state, thereby greatly improving the response speed of the system. For sensorless displacement control, the full-order observer with adaptive parameters constructed by the disclosure can directly output the observed displacement, there is no pure integration problem, and the algorithm has a fast convergence speed and high accuracy in the observed displacement.

(2) The current resonant frequency tracking control algorithm requires displacement signal provided by the sensorless displacement control algorithm. In contrast, the adaptive full-order observer constructed by the present disclosure can simultaneously control displacement and frequency, which overall greatly accelerates the response speed of the system.

(3) The adaptive full-order observer constructed by the present disclosure can adopt either an open-loop structure or a closed-loop structure, and when a closed-loop structure is adopted, the full-order displacement observer poles are configured through the feedback matrix, which can further speed up the observer convergence speed, and increase the upper critical frequency for the stable operation of the system.

DESCRIPTION OF THE EMBODIMENTS

In order to make the purpose, technical solutions, and advantages of the present disclosure clearer, the following further describes the present disclosure in detail with reference to the accompanying drawings and embodiments. It should be understood that the specific embodiments described here are only used to explain the present disclosure, but not to limit the present disclosure. In addition, the technical features involved in the various embodiments of the present disclosure described below can be combined with each other as long as they do not conflict with each other.

The embodiment of the present disclosure provides a linear oscillatory machine control method based on an adaptive full-order displacement observer, including:

S1. A full-order displacement observer is constructed; the full-order displacement observer is used to observe the displacement of the linear oscillatory machine.

Specifically, the specific implementation of step S1 is as follows:

S1.1 Displacement x, speed v, and current i are selected as state variables, voltage u as the input quantity, and current i as the output quantity. The state equation of linear oscillatory machine is listed as:

$$p\begin{bmatrix} x \\ v \\ i \end{bmatrix} = \begin{bmatrix} 0 & 1 & 0 \\ -\frac{k}{m} & -\frac{c}{m} & \frac{k_i}{m} \\ 0 & -\frac{k_i}{L} & -\frac{R}{L} \end{bmatrix} \begin{bmatrix} x \\ v \\ i \end{bmatrix} + \begin{bmatrix} 0 \\ 0 \\ \frac{1}{L} \end{bmatrix} u \quad (1)$$

$$px = Ax + Bu \quad (2)$$

In the equation, p represents the differential operation element, k represents the system equivalent spring elasticity coefficient, c represents the equivalent damping coefficient, m represents the quality of the mover piston, L represents the machine stator inductance, R represents the machine stator resistance, and $k_i$ represents the machine thrust coefficient.

The output equation is as follows:

$$y = [0 \ 0 \ 1] \begin{bmatrix} x \\ v \\ i \end{bmatrix} = i \quad (3)$$

$$y = Cx \quad (4)$$

S1.2 The observability discriminant matrix is listed according to the state equation and output equation, and the observability of the linear oscillatory machine system is determined according to the rank of the discriminant matrix. The observability discriminant matrix is as follows:

$$O_T = \begin{bmatrix} C \\ CA \\ CA^2 \end{bmatrix} = \begin{bmatrix} 0 & 0 & 1 \\ 0 & -\frac{k_i}{L} & -\frac{R}{L} \\ \frac{kk_i}{mL} & \frac{ck_i}{mL} + \frac{Rk_i}{L^2} & -\frac{k_i^2}{mL} + \frac{R^2}{L^2} \end{bmatrix} \quad (5)$$

Obviously, the discriminant matrix is a full-rank matrix, and therefore the linear oscillatory machine system is completely observable, and the full-order state observer can be constructed as follows:

$$p\begin{bmatrix} \hat{x} \\ \hat{v} \\ \hat{i} \end{bmatrix} = \begin{bmatrix} 0 & 1 & 0 \\ -\frac{k}{m} & -\frac{c}{m} & \frac{k_i}{m} \\ 0 & -\frac{k_i}{L} & -\frac{R}{L} \end{bmatrix} \begin{bmatrix} \hat{x} \\ \hat{v} \\ \hat{i} \end{bmatrix} + \begin{bmatrix} 0 \\ 0 \\ \frac{1}{L} \end{bmatrix} u + \begin{bmatrix} g_1 \\ g_2 \\ g_3 \end{bmatrix} (i - \hat{i}) \quad (6)$$

$$p\hat{x} = A\hat{x} + Bu + G(y - \hat{y}) \quad (7)$$

In the equation, $\hat{x}$ represents the displacement observation value, $\hat{v}$ represents the speed observation value, $\hat{i}$ represents the current observation value, and $g_1$, $g_2$, and $g_3$ represent the observer feedback matrix parameters.

S2. For the basic full-order displacement observer equation (6), it is generally assumed that all the coefficients in the equation are known constant constants. However, in fact, the system equivalent spring elasticity coefficient k and equivalent damping coefficient c are all time-varying parameters that change along with the change in the system load. Therefore, based on the Model Reference Adaptive System (MRAS) theory, the system equivalent spring elasticity coefficient k and equivalent damping coefficient c can be selected as adjustable parameters. For the convenience of calculation, the overall k/m and ĉ/m are defined as adjustable parameters $\hat{K}$ and $\hat{C}$, which are substituted into the full-order displacement observer to construct the adjustable model, and the machine itself is used as the reference model. The adjustable model equation is as follows:

$$p\begin{bmatrix} \hat{x} \\ \hat{v} \\ \hat{i} \end{bmatrix} = \begin{bmatrix} 0 & 1 & 0 \\ -\hat{K} & -\hat{C} & \frac{k_i}{m} \\ 0 & -\frac{k_i}{L} & -\frac{R}{L} \end{bmatrix} \begin{bmatrix} \hat{x} \\ \hat{v} \\ \hat{i} \end{bmatrix} + \begin{bmatrix} 0 \\ 0 \\ \frac{1}{L} \end{bmatrix} u + \begin{bmatrix} g_1 \\ g_2 \\ g_3 \end{bmatrix} (i - \hat{i}) \quad (8)$$

$$p\hat{x} = \hat{A}\hat{x} + Bu + G(y - \hat{y}) \quad (9)$$
$$= (\hat{A} - GC)\hat{x} + Bu + Gy$$

Figure 1:
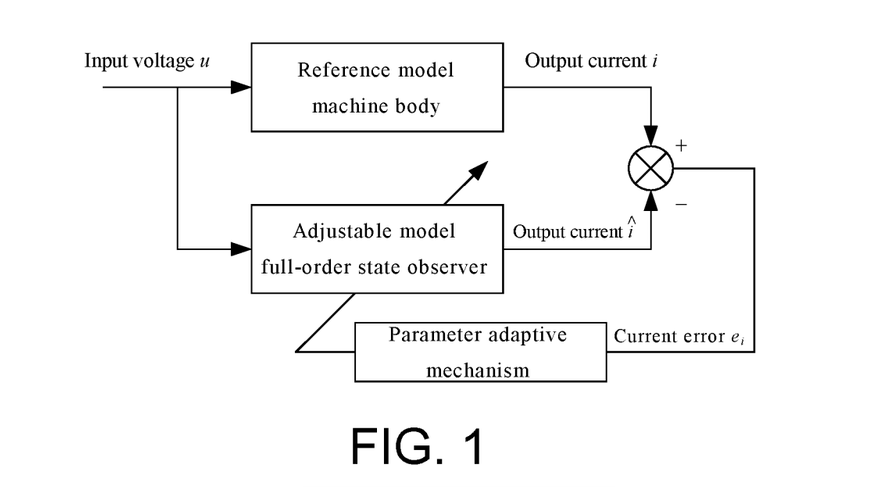
FIG. 1 is a schematic view of the structure of the model reference adaptive system provided by the present disclosure.

The model reference adaptive system constructed by the present disclosure is shown in FIG. 1.

S3. An error state equation is constructed based on the error of the adjustable model and the reference model.

Specifically, by subtracting the constructed adjustable model equation (9) from the original machine state equation (2), the error state equation (11) can be obtained:

$$p(x-\hat{x}) = Ax + Bu - (\hat{A} - GC)\hat{x} - Bu - GCx \quad (10)$$

$$pe = (A - GC)e - (\hat{A} - A)\hat{x} \quad (11)$$

By subtracting equation (8) from equation (1), the specific equation of each matrix in the error state equation (11) can be obtained:

$$A - GC = \begin{bmatrix} 0 & 1 & -g_1 \\ -K & -C & \frac{k_i}{m} - g_2 \\ 0 & -\frac{k_i}{L} & -\frac{R}{L} - g_3 \end{bmatrix} \quad (12)$$

$$\hat{A} - A = \begin{bmatrix} 0 & 0 & 0 \\ -\hat{K} + K & -\hat{C} + C & 0 \\ 0 & 0 & 0 \end{bmatrix} \quad (13)$$

S4. Popov's hyperstability theory is adopted to obtain the upper critical frequency for stable operation of the system and the adaptive formula of adjustable parameters that make the error state equation converge. The adaptive formula of adjustable parameters is expressed by current error.

Figure 2:
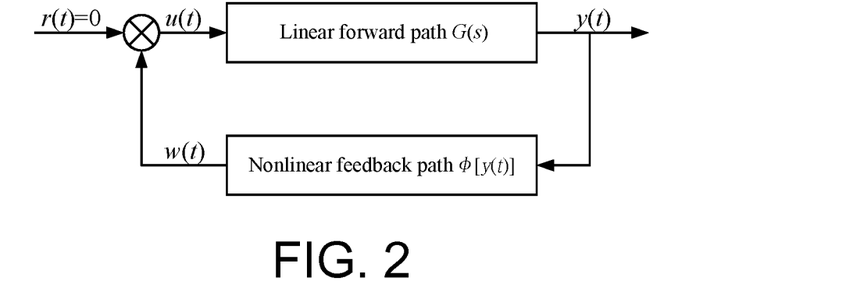
FIG. 2 is a schematic view of the error feedback system provided by the present disclosure.

Step S4 mainly includes: (1) Constructing an error feedback system based on Popov's hyperstability theory; (2) Deriving the adaptive formula of adjustable parameter through Popov's inequality; (3) Deriving the upper critical frequency for the stable operation of the system through positive reality analysis of the forward transfer function of the error feedback system. The specific implementation process is as follows:

01. According to the requirements of Popov's hyperstability theory, an error feedback system is constructed by using the error state equation. The error feedback system is shown in FIG. 2. The system is composed of a linear forward path and a nonlinear feedback path. The input of the linear forward path is $-w$, and the output is $y$; the input of the nonlinear feedback path is $y$, and the output is $w$. According to the error state equation (11), and combined with the error feedback system diagram, the following formula can be obtained:

$$y = e = [e_x, e_v, e_i]^T \quad (14)$$

$$-w = (A - \hat{A})\hat{x} \quad (15)$$

$$w = (\hat{A} - A)\hat{x} = [0 (\hat{K} - K)(-\hat{x}) + (\hat{C} - C)(-\hat{v}) \, 0]^T \quad (16)$$

In the equation, $e_x$ represents displacement error, $e_v$ represents speed error, and $e_i$ represents current error.

02. According to Popov's hyperstability theory, by substituting equations (14) and (16) into Popov's inequality, the adaptive formula of parameter can be derived.

Popov's superstability theory: For the error feedback system sorted into the form as descried above, under the premise that the input $y$ and output $w$ of the nonlinear feedback path satisfy the Popov's integral inequality $$\eta(t_0, t_1) = \int_{t_0}^{t_1} w^T(t) y(t) dt \geq -r_0^2 (\forall t_1 > t_0, r_0^2 \geq 0),$$

the necessary and sufficient condition for the gradual stability of the entire system is that the transfer function of the linear forward path is strictly positive real (SPR).

03. By substituting the aforementioned $y$ and $w$ into the Popov's integral inequality, the adaptive formula of the parameter can be obtained as follows:

$$\hat{K} = k_I \int (-\hat{x}) e_v dt + k_P (-\hat{x}) e_i + K(0) \quad (17)$$

$$\hat{C} = k_I \int (-\hat{v}) e_v dt + k_P (-\hat{v}) e_v + C(0) \quad (18)$$

04. Since the reference model is the machine itself and can only provide current signal as output, the relationship between current error and speed error is substituted into the original parameter adaptive formula (17) (18), so as to obtain the parameter adaptive formula expressed by current error.

By subtracting the observer voltage equation (20) from the actual machine voltage equation (19), the relationship equation (21) of the current error and speed error can be obtained as follows:

$$u = Ri + Lpi + k_i v \quad (19)$$

$$u = R\hat{i} + Lp\hat{i} + k_i \hat{v} - g_3 L e_i \quad (20)$$

$$e_v = -\frac{1}{k_i}(R + g_3 L) e_i - \frac{L}{k_i} p e_i \quad (21)$$

By substituting equation (21) into equations (17) (18), and integrating the coefficients into the proportional coefficient $k_P$, the integral coefficient $k_I$, and the differential coefficient $k_D$, the following can be obtained:

$$\hat{K} = k_I \int \hat{x} e_i dt + k_P \hat{x} e_i + k_D \hat{x} p e_i + K(0) \quad (22)$$

$$\hat{C} = k_I \int \hat{v} e_i dt + k_P \hat{v} e_i + k_D \hat{v} p e_i + C(0) \quad (23)$$

In order to simplify the calculation, the differential coefficient is set to 0, and the parameter adaptive formula expressed by the current error in the form of PI can be obtained:

$$\hat{K} = k_I \int \hat{x} e_i dt + k_P \hat{x} e_i + K(0) \quad (24)$$

$$\hat{C} = k_I \int \hat{v} e_i dt + k_P \hat{v} e_i + C(0) \quad (25)$$

05. According to the parameter adaptive formula expressed by current error, the output of the linear forward path is the current error $e_i$, and the input is $-w = (K - \hat{K})(-\hat{x}) + (C - \hat{C})(-\hat{v})$, and the error state equation is expanded as:

$$p e_x = e_v - g_1 e_i \quad (26)$$

$$p e_v = -K e_x - C e_v + \left(\frac{k_i}{m} - g_2\right) e_i + (\hat{K} - K)(-\hat{x}) + (\hat{C} - C)(-\hat{v})$$

$$p e_i = -\frac{k_i}{L} e_v + \left(-\frac{R}{L} - g_3\right) e_i$$

Equation (26) is transferred to the s domain as:

$$e_v = -\frac{L}{k_i}\left(s + \frac{R}{L} + g_3\right) e_i \quad (27)$$

$$e_x = \frac{1}{s}\left[-\frac{L}{k_i}\left(s + \frac{R}{L} + g_3\right) - g_1\right] e_i \quad (28)$$

By substituting equations (27) and (28) into the second equation of equation (26), transfer function of the linear forward path can be obtained as:

$$\frac{e_i}{-w} = G(s) = \frac{m k_i s}{mLs^3 + As^2 + Bs + C} \quad (29)$$

The coefficient in equation (29) is:

$$A = mR + g_3 mL + cL$$

$$B = kL + Rc + g_3 cL + k_i^2 - g_2 m k_i \quad (30)$$

$$C = k(R + g_3 L) + g_1 k k_i$$

06. If the full-order observer has an open-loop structure, the feedback matrix is 0, and the transfer function of linear forward path can be expressed as:

$$G(s) = \frac{m k_i s}{mLs^3 + (mR + cL)s^2 + (kL + Rc + k_i^2)s + kR} \quad (31)$$

According to Popov's hyperstability theory, the transfer function (31) must be a strictly positive real function. According to the definition of positive reality, if the following three conditions are met, the rational function $G(s)=N(s)/D(s)$ for the complex variable $s=\sigma+j\omega$ is a strictly positive real function:

(1) G(s) is defined when s is real; (2) G(s) has no pole on the right half-closed plane; (3) $\text{Re}[G(j\omega)]>0$ for $-\infty<\omega<\infty$.

The condition (1) is obviously satisfied. By utilized the Routh criterion, it can be seen that the condition (2) is also satisfied. For the condition (3), by substituting $s=j\omega$, the following formula can be obtained:

$$\text{Re}[G(jw)] = \frac{mk_i w^2(kL + Rc + k_i^2 - mLw^2)}{[kR - (cL + mR)w^2]^2 + w^2(kL + Rc + k_i^2 - mLw^2)^2} \quad (32)$$

Obviously, to satisfy condition (3), the numerator of equation (32) must be greater than 0. Based on the above, the upper critical frequency for stable operation of the system can be deduced as follows:

$$w < \sqrt{\frac{k}{m} + \frac{Rc + k_i^2}{mL}} \quad (33)$$

07. If the full-order observer adopts a closed-loop structure, the specific parameters of the feedback matrix should be derived by utilizing the n-times pole configuration method based on the linear control theory, so that the response speed of the full-order observer is greater than that of the machine.

The characteristic equation of the machine itself is listed as follows:

$$|\lambda I - A| = \lambda^3 + \left(\frac{c}{m} + \frac{R}{L}\right)\lambda^2 + \frac{Rc + kL + k_i^2}{mL}\lambda + \frac{kR}{mL} \quad (34)$$

Assuming the poles of the machine are $r_1$, $r_2$, and $r_3$, and the corresponding characteristic equation is:

$$(\lambda-r_1)(\lambda-r_2)(\lambda-r_3)=\lambda^3-(r_1+r_2+r_3)\lambda^2+(r_1r_2+r_1r_3+r_2r_3)\lambda-r_1r_2r_3 \quad (35)$$

If the pole of the observer is configured to be n times the pole of the machine itself, that is, the poles of the observer are $nr_1$, $nr_2$, and $nr_3$, the characteristic equation of the observer can be obtained as follows:

$$(\lambda-nr_1)(\lambda-nr_2)(\lambda-nr_3)=\lambda^3-n(r_1+r_2+r_3)\lambda^2+n^2(r_1r_2+r_1r_3+r_2r_3)\lambda-n^3r_1r_2r_3 \quad (36)$$

Combining equations (34)(35), the following equation can be obtained:

$$(\lambda - nr_1)(\lambda - nr_2)(\lambda - nr_3) = \quad (37)$$
$$\lambda^3 + n\left(\frac{c}{m} + \frac{R}{L}\right)\lambda^2 + n^2\frac{Rc + kL + k_i^2}{mL}\lambda + n^3\frac{kR}{mL}$$

The actual characteristic equation of the observer is:

$$|\lambda I - (A - GC)| = \lambda^3 + \left(\frac{c}{m} + \frac{R}{L} + g_3\right)\lambda^2 + \quad (38)$$
$$\frac{Rc + k_i^2 + kL + cLg_3 - mk_i g_2}{mL}\lambda + \frac{kR}{mL} + \frac{k}{m}\left(g_3 + \frac{k_i}{L}g_1\right)$$

Combining equations (37)(38), the feedback matrix parameters are obtained as follows:

$$g_3 = (n-1)\left(\frac{c}{m} + \frac{R}{L}\right) \quad (39)$$
$$g_2 = \frac{(n^2-1)(Rc + kL + k_i^2) - Lcg_3}{-mk_i}$$
$$g_1 = \frac{R(n^3-1) - Lg_3}{k_i}$$

08. The closed-loop adaptive observer can be constructed by utilizing the above feedback matrix parameters, and the stability of the closed-loop observer can be analyzed by utilizing the definition of positive realness of functions.

The positive realness condition (1) is obviously satisfied, and the Routh criterion can be used to prove that the forward path transfer function also satisfies the positive realness condition (2) under the condition of the closed-loop observer. According to the Routh criterion, if the following conditions are met: (1) the coefficients of the characteristic equation of the transfer function are all positive; (2) the coefficients in the first column of the Routh table are all positive. Then the root of the characteristic equation, that is, the poles of the system are all at left half plane.

Based on the transfer function equation (29) and the coefficient equation (30), if the feedback matrix makes all the coefficients in equation (30) to be greater than 0, then the Routh criterion (1) is satisfied. By substituting (39) into (30), and the coefficients in the feedback matrix can be derived as:

$$A=n(mR+cL) \quad (40)$$

$$B=n^2(Rc+kL+k_i^2) \quad (41)$$

$$C=n^3kR \quad (42)$$

The feedback matrix configures the observer pole to the left of the machine pole, so coefficient n must greater than 1, thus the ABC coefficients are all greater than 0, and the Routh criterion condition (1) is satisfied.

For Routh criterion condition (2), the Routh table is listed as follows:

$$\begin{array}{cc} mL & B \\ A & C \\ \dfrac{AB - mLC}{A} & \end{array} \quad (43)$$

To satisfy the Routh criterion condition (2), the last line of equation (43) must be positive, the last line can be calculated as:

$$AB-mLC=x^3(cL+mR)(Rc+k_i^2)+x^3ckL^2>0 \quad (44)$$

Therefore, the Routh criterion condition (2) is satisfied. In summary, the positive realness condition (2) of function is satisfied.

According to the positive realness condition (3) of the function, after a similar derivation process, the upper critical frequency for the stable operation of the closed-loop observer can be obtained as:

$$w < \sqrt{\frac{k}{m} + \frac{Rc + Lcg_3 + (k_i^2 - mk_i g_2)}{mL}} \quad (45)$$

By substituting the feedback matrix parameter, the upper limit critical frequency for the stable operation of the closed-loop observer can be obtained as:

$$w < n\sqrt{\frac{k}{m} + \frac{Rc + k_i^2}{mL}} \quad (46)$$

The feedback matrix can not only configure the poles of the observer to be n times the poles of the machine itself, and effectively accelerate the convergence speed of the observer, but also increase the upper critical frequency to n times that of the open-loop observer.

S5. The motor operating frequency is set to be lower than the upper cut-off frequency, and the measured machine current and voltage signals are input into the full-order displacement observer. The observed displacement output by the full-order observer is adopted to perform closed-loop control on the machine displacement, and the estimated resonant frequency output by the observer is adopted as the operating frequency of the system.

Figure 3:
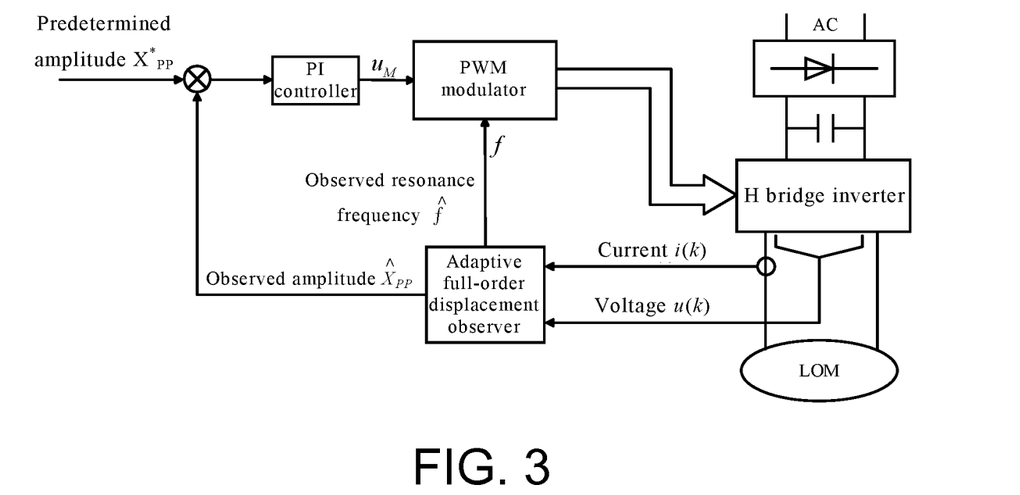
FIG. 3 is a block view of the overall control system of a linear oscillatory machine adopting the adaptive full-order displacement observer provided by the present disclosure.

As shown in FIG. 3, the observed displacement output by the closed-loop adaptive full-order observer is input into the amplitude control system as the displacement feedback signal, and the estimated resonance frequency can be obtained by equation $$\hat{f} = \frac{\sqrt{\hat{k}/m}}{2\pi},$$

which is taken as the frequency control signal and is input into the frequency control system to realize the sensorless resonant frequency tracking control of the linear oscillatory machine.

The embodiment of the present disclosure uses a stator permanent magnet type dual stator linear oscillatory machine as an example to verify the above method. The rated power is 120 W, rated operating frequency is 30 Hz, stator resistance is 18Ω, stator inductance is 0.59 H, thrust coefficient is 47.08 N/A, the quality of the mover piston is 0.93 kg; the system actual equivalent damping coefficient c=20 N/(m/s), and the system actual equivalent spring elasticity coefficient k=30 kN/m.

Figure 4:
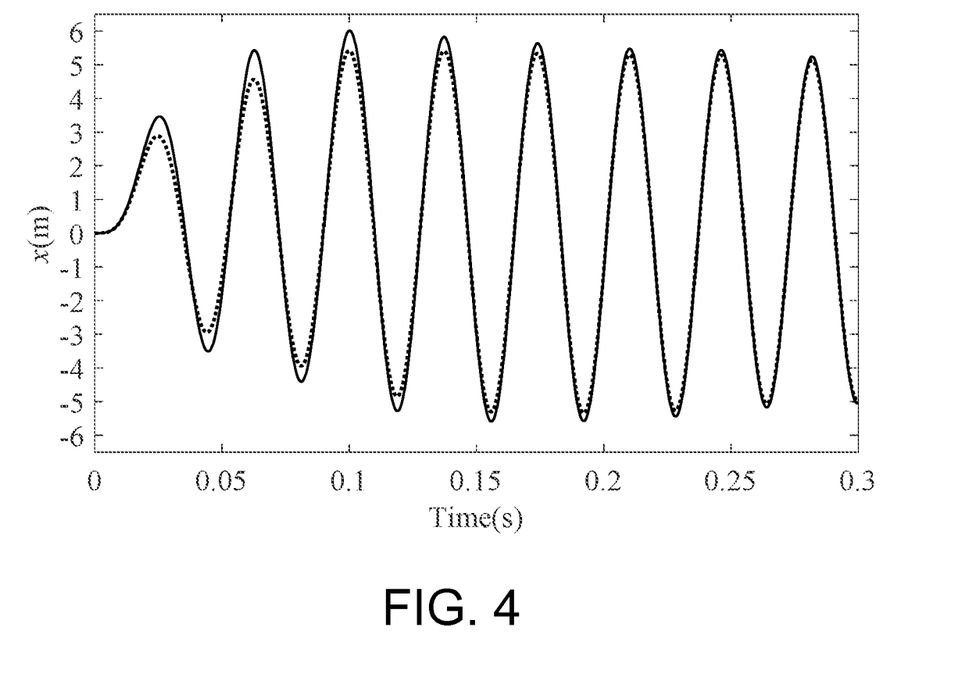
FIG. 4 is a simulation result of the displacement observation effect provided by the present disclosure.
Figure 5:
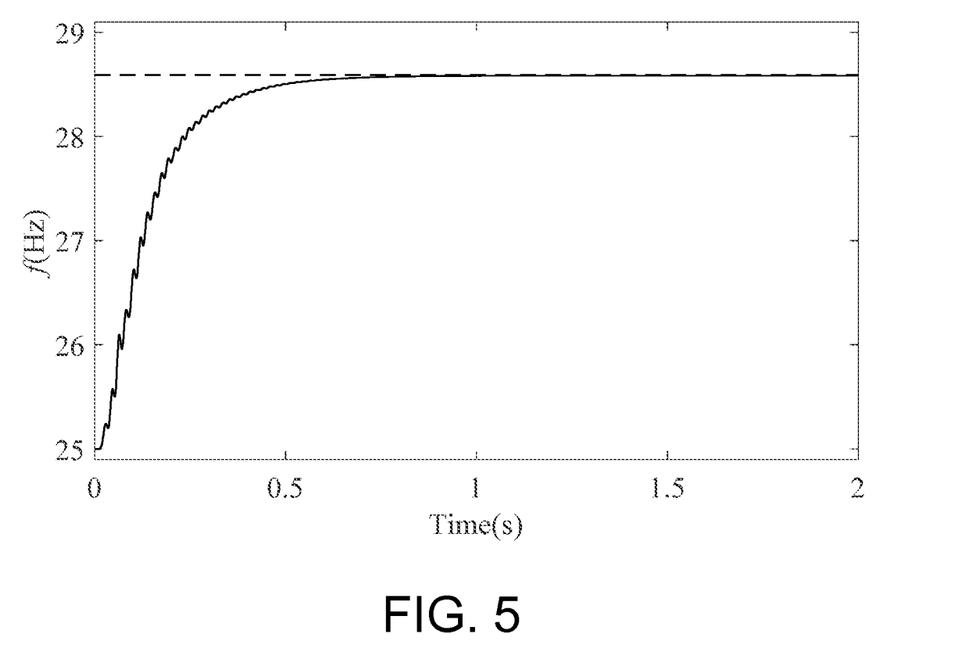
FIG. 5 is a simulation result of the resonance frequency tracking control effect provided by the present disclosure.

As shown in FIG. 4, the solid line represents the actual displacement, and the dashed line represents the observed displacement. There is a little error between the actual displacement and the observed displacement when the system is just started. As the MRAS algorithm starts to work, the adjustable parameters are converging to its actual value. Meanwhile, the error between the observed displacement and the actual displacement convergences to zero, and the observed displacement convergences to the actual displacement at steady state. As shown in FIG. 5, the dashed line represents the system actual resonant frequency 28.59 Hz, and the solid line represents the changing trend of the system operating frequency under the action of the MRAS algorithm. It can be seen that when the system is just started and the amplitude has not reached the predetermined value, the resonant frequency tracking control system can begin serving its function, so that the system operating frequency continuously develops toward the resonant frequency, and finally completely convergences to the resonance frequency. The simulation results prove the effectiveness of the method, and show that this novel method benefits from high accuracy and fast system response speed.

Those skilled in the art can easily understand that the above are only preferred embodiments of the present disclosure and are not intended to limit the present disclosure. Any modification, equivalent replacement and improvement, etc., made within the spirit and principle of the present disclosure should fall within the protection scope of the present disclosure.

What is claimed is:

1. A linear oscillatory machine control method based on an adaptive full-order displacement observer, comprising:
   S1. a full-order displacement observer is constructed; the full-order displacement observer is utilized to observe displacement of a linear oscillatory machine;
   S2. a model reference adaptive parameter identification method in which a system equivalent spring elasticity coefficient and an equivalent damping coefficient are used as parameters to be identified, substituting them into the full-order displacement observer to construct an adjustable model, and the machine itself serves as a reference model;
   S3. an error state equation is constructed based on an error of the adjustable model and the reference model;
   S4. Popov's superstability theory is adopted to obtain an upper critical frequency for stable operation of the system and an adaptive formula of adjustable parameters that make the error state equation converge; the adaptive formula of the adjustable parameters is expressed by a current error;
   S5. the machine is operated at a frequency lower than the upper critical frequency, a machine current and voltage signals measured during an operation process are input into the full-order displacement observer, an observed displacement output by the full-order observer is adopted to perform closed-loop control on machine displacement, and the observed resonant frequency output by the observer is adopted as operating frequency of the system.

2. The linear oscillatory machine control method based on the adaptive full-order displacement observer according to claim 1, wherein the adjustable model equation is as follows:

$$p\begin{bmatrix} \hat{x} \\ \hat{v} \\ \hat{i} \end{bmatrix} = \begin{bmatrix} 0 & 1 & 0 \\ -\hat{K} & -\hat{C} & \frac{k_i}{m} \\ 0 & -\frac{k_i}{L} & -\frac{R}{L} \end{bmatrix}\begin{bmatrix} \hat{x} \\ \hat{v} \\ \hat{i} \end{bmatrix} + \begin{bmatrix} 0 \\ 0 \\ \frac{1}{L} \end{bmatrix}u + \begin{bmatrix} g_1 \\ g_2 \\ g_3 \end{bmatrix}(i - \hat{i})$$

wherein p represents a differential operation element, $\hat{x}$ represents a displacement observation value, $\hat{v}$ represents a speed observation value, $\hat{i}$ represents a current observation value, $\hat{K}=\hat{k}/m$, $\hat{C}=\hat{c}/m$, $\hat{k}$ represents an estimated value of the system equivalent spring elasticity coefficient calculated through the adaptive formula of the parameter, ĉ represents an estimated value of the system equivalent damping coefficient obtained through the adaptive formula of the parameter, m represents the quality of a mover piston, L represents a machine stator inductance, R represents a machine stator resistance, $k_i$ represents a machine thrust coefficient, it represents an input voltage, i represents a stator current, $g_1$, $g_2$, and $g_3$ represent observer feedback matrix coefficients.

3. The linear oscillatory machine control method based on the adaptive full-order displacement observer according to claim 2, wherein the adaptive formula of the adjustable parameter expressed by the current error is as follows:

$$\hat{K}=k_I\!\int\!\hat{x}e_i dt+k_p\hat{x}e_i+K(0)$$

$$\hat{C}=k_I\!\int\!\hat{v}e_i dt+k_p\hat{v}e_i+C(0)$$

wherein $k_I$ represents an integral coefficient, $k_p$ represents a proportional coefficient, $e_i$ represents a current error, and K(0) and C(0) represent initial values of the parameters to be identified.

4. The linear oscillatory machine control method based on the adaptive full-order displacement observer according to claim 3, wherein the full-order displacement observer has an open-loop structure, if its feedback matrix coefficients g 1, g2, and g3 are all zero.

5. The linear oscillatory machine control method based on the adaptive full-order displacement observer according to claim 4, wherein the upper critical frequency for stable operation of the system is as follows:

$$w_0 = \sqrt{\frac{k}{m}+\frac{Rc+k_i^2}{mL}}.$$

6. The linear oscillatory machine control method based on the adaptive full-order displacement observer according to claim 3, wherein the full-order displacement observer has a closed-loop structure, if its feedback matrix coefficients are:

$$g_3 = (n-1)\left(\frac{c}{m}+\frac{R}{L}\right)$$

$$g_2 = \frac{(n^2-1)(Rc+kL+k_i^2)-Lcg_3}{-mk_i}$$

$$g_1 = \frac{R(n^3-1)-Lg_3}{k_i}$$

wherein n is a scale coefficient greater than 1.

7. The linear oscillatory machine control method based on the adaptive full-order displacement observer according to claim 2, wherein the full-order displacement observer has an open-loop structure, if its feedback matrix coefficients g1, g2, and g3 are all zero.

8. The linear oscillatory machine control method based on the adaptive full-order displacement observer according to claim 7, wherein the upper critical frequency for stable operation of the system is as follows:

$$w_0 = \sqrt{\frac{k}{m}+\frac{Rc+k_i^2}{mL}}.$$

9. The linear oscillatory machine control method based on the adaptive full-order displacement observer according to claim 2, wherein the full-order displacement observer has a closed-loop structure, if its feedback matrix coefficients are:

$$g_3 = (n-1)\left(\frac{c}{m}+\frac{R}{L}\right)$$

$$g_2 = \frac{(n^2-1)(Rc+kL+k_i^2)-Lcg_3}{-mk_i}$$

$$g_1 = \frac{R(n^3-1)-Lg_3}{k_i}$$

wherein n is a scale coefficient greater than 1.

10. The linear oscillatory machine control method based on the adaptive full-order displacement observer according to claim 9, wherein by using the feedback matrix coefficient, poles of the full-order displacement observer are configured to be n times poles of the machine itself, so that the upper critical frequency for stable operation of the system is as follows:

$$w_0 = n\sqrt{\frac{k}{m}+\frac{Rc+k_i^2}{mL}}.$$

11. The linear oscillatory machine control method based on the adaptive full-order displacement observer according to claim 2, wherein in step S3, the step of constructing the error state equation based on the errors of the adjustable model and the reference model is specifically as follows: subtracting the adjustable model equation from the linear oscillating machine state equation to obtain the error state equation.

12. The linear oscillatory machine control method based on the adaptive full-order displacement observer according to claim 11, wherein the adaptive formula of the adjustable parameter expressed by the current error is as follows:

$$\hat{K}=k_I\!\int\!\hat{x}e_i dt+k_p\hat{x}e_i+K(0)$$

$$\hat{C}=k_I\!\int\!\hat{v}e_i dt+k_p\hat{v}e_i+C(0)$$

wherein $k_I$ represents an integral coefficient, $k_p$ represents a proportional coefficient, $e_i$ represents a current error, and K(0) and C(0) represent initial values of the parameters to be identified.

13. The linear oscillatory machine control method based on the adaptive full-order displacement observer according to claim 11, wherein the full-order displacement observer has an open-loop structure, if its feedback matrix coefficients g1, g2, and g3 are all zero.

14. The linear oscillatory machine control method based on the adaptive full-order displacement observer according to claim 11, wherein the full-order displacement observer has a closed-loop structure, if its feedback matrix coefficients are:

$$g_3 = (n-1)\left(\frac{c}{m}+\frac{R}{L}\right)$$

$$g_2 = \frac{(n^2-1)(Rc+kL+k_i^2)-Lcg_3}{-mk_i}$$

-continued $$g_1 = \frac{R(n^3 - 1) - Lg_3}{k_i}$$

wherein n is a scale coefficient greater than 1.

15. The linear oscillatory machine control method based on the adaptive full-order displacement observer according to claim 1, wherein in step S3, the step of constructing the error state equation based on the errors of the adjustable model and the reference model is specifically as follows: subtracting the adjustable model equation from the linear oscillating machine state equation to obtain the error state equation.

16. The linear oscillatory machine control method based on the adaptive full-order displacement observer according to claim 15, wherein the adaptive formula of the adjustable parameter expressed by the current error is as follows:

$$\hat{K} = k_I \int \hat{x} e_i dt + k_p \hat{x} e_i + K(0)$$

$$\hat{C} = k_I \int \hat{v} e_i dt + k_p \hat{v} e_i + C(0)$$

wherein $k_I$ represents an integral coefficient, $k_p$ represents a proportional coefficient, $e_i$ represents a current error, and K(0) and C(0) represent initial values of the parameters to be identified.

17. The linear oscillatory machine control method based on the adaptive full-order displacement observer according to claim 15, wherein the full-order displacement observer has an open-loop structure, if its feedback matrix coefficients g1, g2, and g3 are all zero.

18. The linear oscillatory machine control method based on the adaptive full-order displacement observer according to claim 17, wherein the upper critical frequency for stable operation of the system is as follows:

$$w_0 = \sqrt{\frac{k}{m} + \frac{Rc + k_i^2}{mL}}.$$

19. The linear oscillatory machine control method based on the adaptive full-order displacement observer according to claim 15, wherein the full-order displacement observer has a closed-loop structure, if its feedback matrix coefficients are:

$$g_3 = (n-1)\left(\frac{c}{m} + \frac{R}{L}\right)$$

$$g_2 = \frac{(n^2 - 1)(Rc + kL + k_i^2) - Lcg_3}{-mk_i}$$

$$g_1 = \frac{R(n^3 - 1) - Lg_3}{k_i}$$

wherein n is a scale coefficient greater than 1.

20. The linear oscillatory machine control method based on the adaptive full-order displacement observer according to claim 19, wherein by using the feedback matrix coefficient, poles of the full-order displacement observer are configured to be n times poles of the machine itself, so that the upper critical frequency for stable operation of the system is as follows:

$$w_0 = n\sqrt{\frac{k}{m} + \frac{Rc + k_i^2}{mL}}.$$

* * * * *